UNITED STATES PATENT OFFICE.

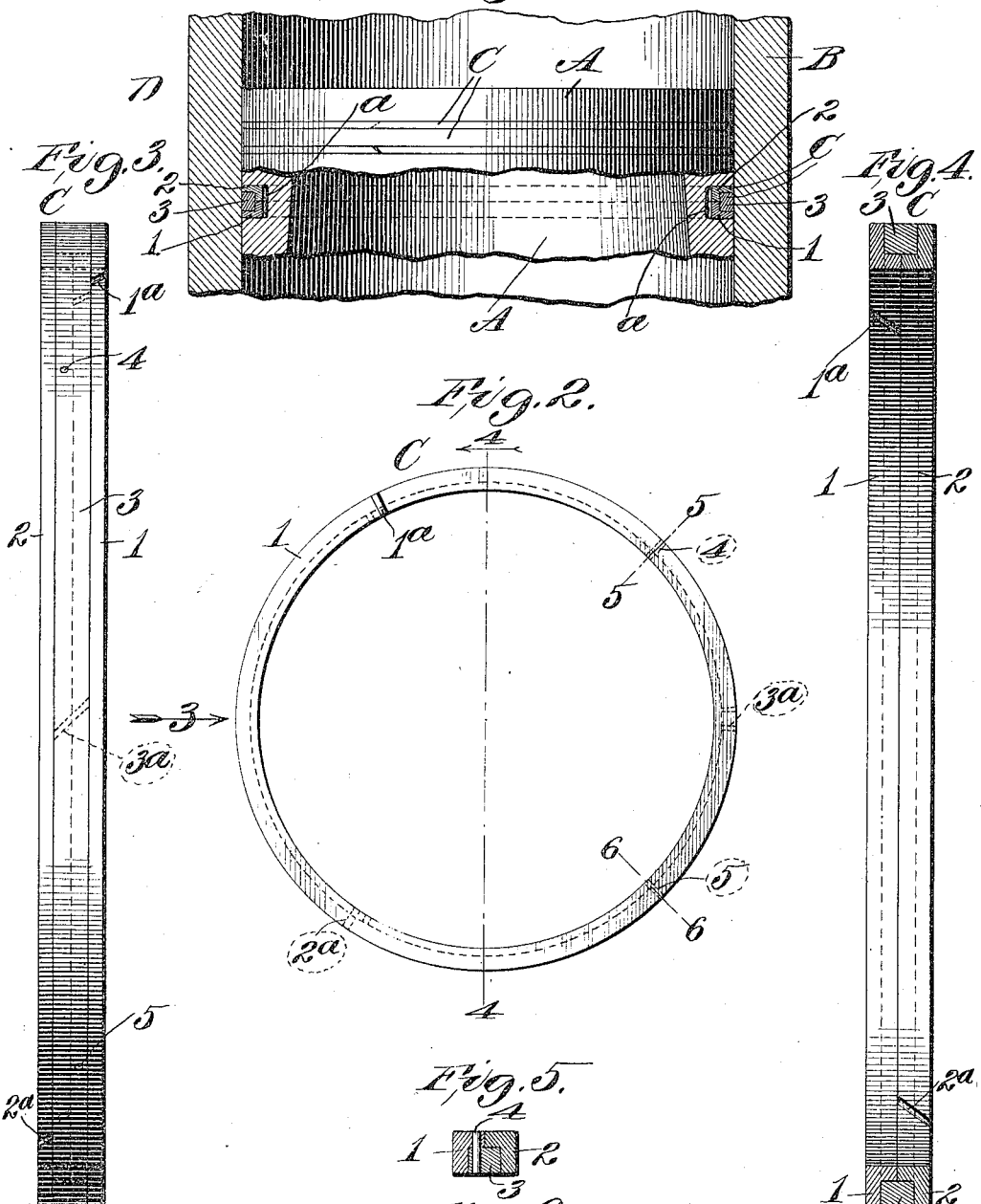

WALTER M. OLDENDORPH, OF ST. LOUIS, MISSOURI, ASSIGNOR OF ONE-HALF TO WILFRED H. SPEAR, OF ST. LOUIS, MISSOURI.

PACKING-RING.

1,237,545.

Specification of Letters Patent.  Patented Aug. 21, 1917.

Application filed June 30, 1913.  Serial No. 776,484

*To all whom it may concern:*

Be it known that I, WALTER M. OLDENDORPH, a citizen of the United States, and a resident of St. Louis, Missouri, have invented certain new and useful Improvements in Packing-Rings, of which the following is a specification.

The packing ring of my invention is a three-part resilient ring, each of its annular members being split transversely to permit it to be sprung into place upon a piston head, and the gaps in the three members being held equidistant from each other when the ring is positioned for use. The packing ring is adapted for use in any pump, engine or other mechanism wherein circular or oval piston heads are employed, and the function of my invention is to provide a composite ring whose members are severally readily sprung into operative position, and assembled together, within the packing-groove of a piston head.

In the accompanying drawing—

Figure 1 is a fragmental view of a piston head having two packing grooves, in which grooves are packing rings embodying my invention.

Fig. 2 is a plan view of the ring of my invention.

Fig. 3 is an elevation of said ring taken from the side indicated by the numeral 3 and arrow-pointer in Fig. 2.

Fig. 4 is a diametric sectional view of the same taken on the line 4—4 of Fig. 2.

Fig. 5 is a sectional view through the body of the ring on the line indicated by 5—5 in Fig. 2.

Fig. 6 is a similar view taken on the line 6—6 of Fig. 2.

As is well known to those skilled in the art to which my invention relates, piston heads A are usually provided with peripheral grooves $a$, approximately square in section, wherein various packing instrumentalities are mounted, to guard against leakage of the steam, air, or other fluid used as the actuating power of the piston. I am aware that split rings have been heretofore employed in this location, and my invention resides in the structure illustrated, wherein two annular split rings, 1 and 2, L-shaped in cross-section, their inner flanges contacting with each other, receive and hold between their outer flanges the split annulus 3, which is rectangular in section, and of such dimensions that, when seated in place upon the bands 1 and 2 it forms with them a three-part packing ring having a peripheral face in substantial alinement with that of the piston-head.

Each of the elements 1, 2 and 3 is transversely or obliquely slit, as indicated in the drawings by the numerals $1^a$, $2^a$ and $3^a$. It is desirable to keep these points of severance equidistant, and to preserve the proper relative positions of the parts, and to that end I employ pins 4 and 5 to detachably secure the annular bands 1 and 2 to the annulus 3, the pins passing through the members as shown in Figs. 5 and 6, and being located at the points indicated by the lines 5—5 and 6—6 on Fig. 2.

By these means the opening or transverse slot in each of the three members is opposite a solid part of another member, or other members, whereby leakage through the ring is prevented. The annular bands and the annulus each have an outer peripheral bearing surface contacting with the inner surface of the cylinder B, as shown in Fig. 1; and each of said three members, by reason of its construction, has more or less outwardly-directed resiliency at the terminals where it is split or severed, so that, in the entire ring, there are six terminal portions where the tendency to spring outward assists in maintaining tight fitting contact between the packing ring and the cylinder, and said terminal portions are at all times, by reason of the above described construction, equi-distant from each other.

The terminals $1^a$, $2^a$ and $3^a$ are so disposed as to be equidistant from each other (see Fig. 2) thereby securing perfect balance of the packing ring, with uniform outward pressure at three portions of its periphery, and consequently uniform wear upon the inner face of the cylinder.

Having thus described my invention, what I claim as new and desire to have secured to me by the grant of Letters Patent, is—

1. A packing ring comprising two split rings, each having an inturned bottom flange, and a peripheral side flange projecting at a right angle from said bottom flange; and a split annulus seated between said side flanges and upon said bottom flanges; securing means for positively preventing relative movement between the split rings and the annulus.

2. A packing ring comprising two split rings each having an inturned bottom flange and a peripheral side flange projecting at right angles from the bottom flange, a split annulus seated between said flanges and upon said bottom flanges, and locking pins passing through the split rings and the annulus for preventing relative movement between said rings and annulus.

3. A packing ring comprising a body portion formed of two split rings arranged side by side and having their inner peripheries formed with annular flanges, said flanges in contact with each other and coöperating with the rings to form a groove of rectangular cross sectional shape upon the outer surface of the body portion, and a split expansible ring of the same cross sectional shape as said groove snugly fitting within said groove, the split portions of said rings being of diagonal formation and so arranged as to break joints.

In testimony whereof, I have signed my name to this specification, in presence of two subscribing witnesses.

WALTER M. OLDENDORPH.

Witnesses:
 WILFRED H. SPEAR,
 JAMES L. HOPKINS.

Copies of this patent may be obtained for five cents each, by addressing the "Commissioner of Patents, Washington, D. C."